Patented Nov. 21, 1922.

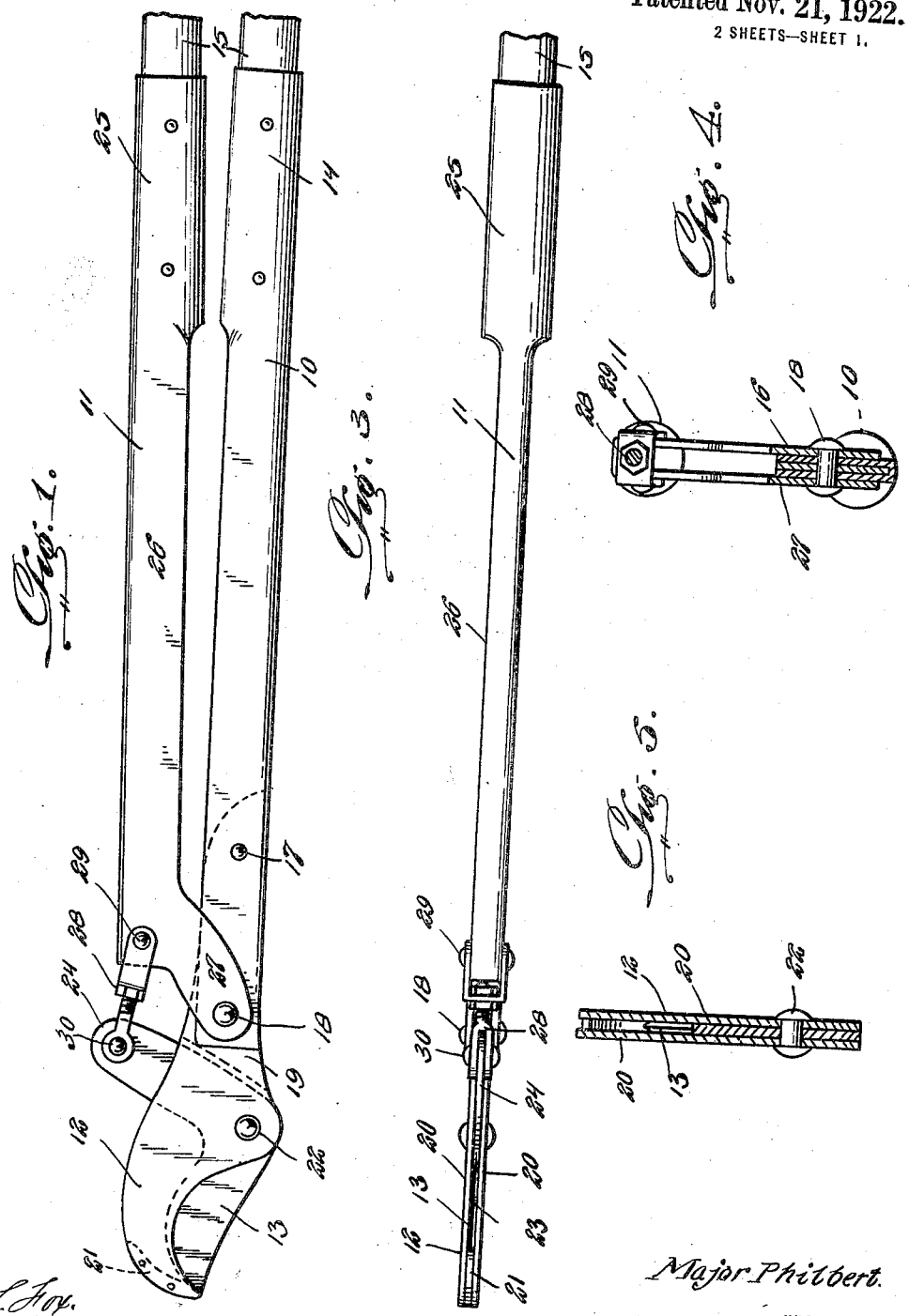

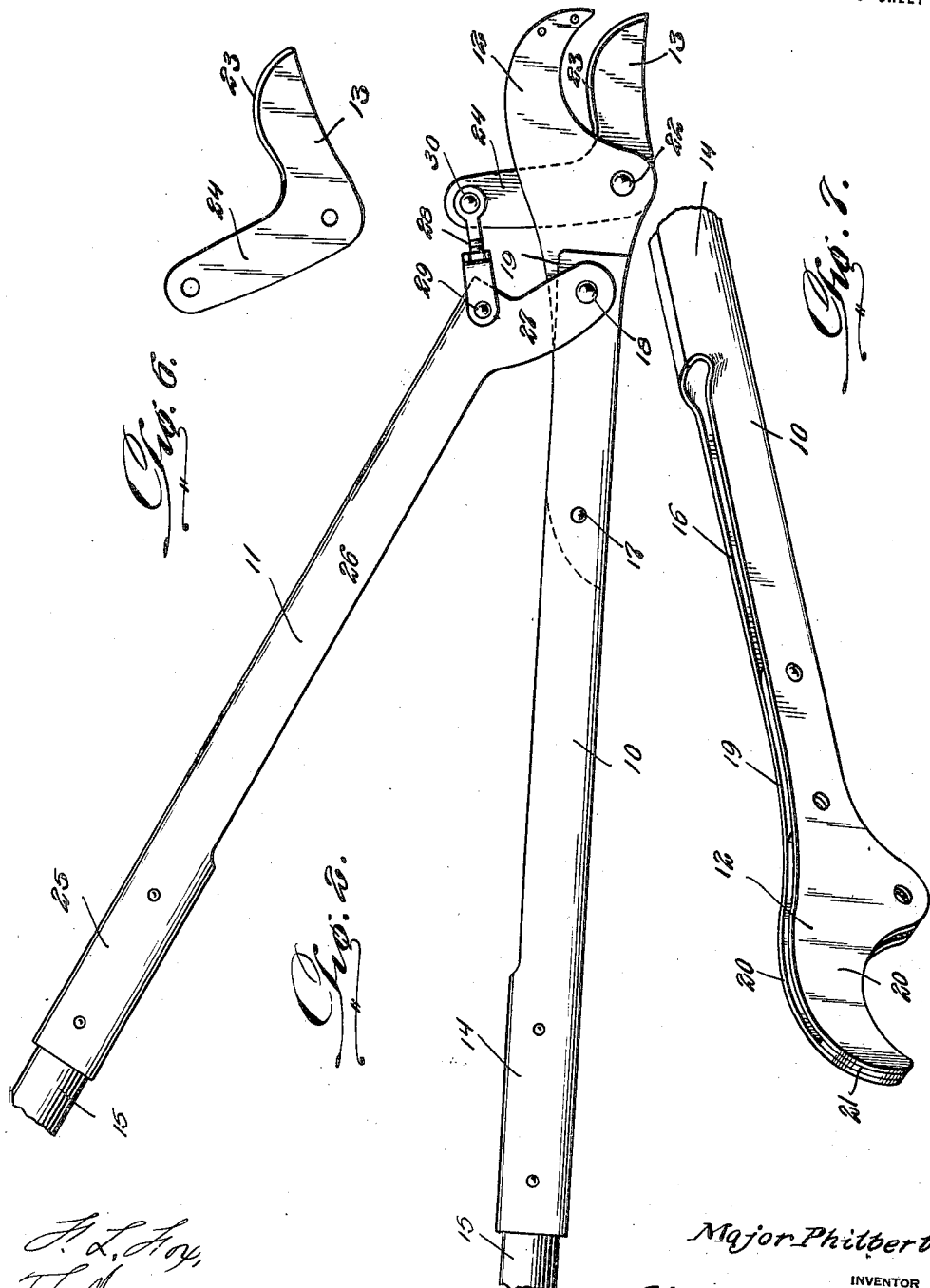

1,436,603

UNITED STATES PATENT OFFICE.

MAJOR PHILBERT, OF WINDSOR, CALIFORNIA, ASSIGNOR TO JAMES M. CAMPBELL, OF SANTA ROSA, CALIFORNIA.

PRUNING DEVICE.

Application filed August 23, 1920. Serial No. 406,563.

*To all whom it may concern:*

Be it known that I, MAJOR PHILBERT, a citizen of the United States, residing at Windsor, in the county of Sonoma and State of California, have invented new and useful Improvements in Pruning Devices, of which the following is a specification.

This invention relates to improvements in pruning shears and has for an object the provision of a device of this character in which a maximum of leverage is exerted upon the shear blades.

Another object is the provision of a pruning shear in which the movable blade or knife is guided between spaced blades and lateral movement or spreading of the blades prevented, thereby adding greatly to the effectiveness of the device.

Another object is the provision of a device of this character which is simple and durable of construction and in which the movable blade or knife may be easily and quickly removed for sharpening.

With the above and other objects in view, the invention further includes the following novel features and details of construction, to be hereinafter more fully described, illustrated in the accompanying drawings and pointed out in the appended claim.

In the drawings:—

Figure 1 is a side elevation of the invention, the shear blades being shown in closed position.

Figure 2 is a similar view showing the blades open.

Figure 3 is an edge view.

Figure 4 is an enlarged transverse section on a line with the pivotal connection of the handles.

Figure 5 is a similar view through the pivotal connection of the shear blades.

Figure 6 is a detailed view of the pivoted blade.

Figure 7 is a detailed perspective view of the socketed handle member which carries the rigid shear blade.

Referring to the drawings in detail, wherein like characters of reference denote corresponding parts, the reference characters 10 and 11 designate respectively socketed handle members which are connected to the rigid shear blade 12 and the movable shear blade 13.

These socketed handle members are preferably formed of sheet metal, one end being bent into substantially cylindrical form as shown at 14 for the reception of a wooden handle, a portion of which is indicated at 15. The remainder of the handle members are flattened, being bent longitudinally and spaced apart as shown at 16 so as to provide a longitudinal groove.

Secured within this groove by fastening devices 17 and 18, is the shank 19 of the rigid shear blade 12. This blade is of novel construction being provided with a longitudinal slot to define spaced members 20 which are connected at their outer ends as shown at 21.

Mounted upon a pivot 22 which extends through the spaced members 20 is a movable shear blade 13, the latter comprising a knife portion having a cutting edge 23 and a substantially right angularly disposed arm 24. The blade 13 is thus mounted for pivotal movement between the spaced members 20 and relative lateral movement of the blades 12 and 13 is prevented, so that it is impossible to wedge the material being cut between the blades.

The socketed handle member 11 is similar in construction to the handle member 10, in that it is formed of sheet metal and provided at one end with a substantially cylindrical portion 25 and a flattened portion 26 which terminates in spaced ears 27. These ears are provided with apertures which receive the fastening device 18 so as to pivotally secure the member 25 upon the member 14. A link 28 has one end pivotally secured to the socketed handle member 11 as shown at 29 and its opposite end pivotally secured to the arm 24 of the blade 13 as indicated at 30.

The invention is susceptible of various changes in its form, proportions and minor details of construction and the right is herein reserved to make such changes as properly fall within the scope of the appended claim.

Having described the invention what is claimed is:—

A pruning device comprising socketed handle members, a rigid and movable shear blade connected to said members, said members formed of sheet metal and having one end bent into substantially cylindrical form, a wooden handle inserted therein, the remaining handle members flattened and bent longitudinally and spaced apart to provide a longitudinal groove, said rigid blade having its shank secured in said groove, fastening devices adapted to secure the shank therein and said blade being provided with a longitudinal slot to define spaced members which are connected at their outer ends, a pivot member extending through said spaced members and said movable blade mounted thereon, the latter consisting of a knife portion having a cutting edge and a right angularly disposed arm, one of said handle members being formed of sheet metal and provided at one end with a cylindrical portion and a flattened portion which terminates in spaced ears, said ears having apertures therein to receive said fastening device, a link having one end pivotally secured to one of the socket handles and its opposite end pivotally secured to one of the right angularly disposed arms of said movable blade.

In testimony whereof I affix my signature.

MAJOR PHILBERT.